Sept. 20, 1955 J. A. WILSON 2,718,147
LIQUID LEVEL INDICATOR
Filed June 8, 1953

INVENTOR.
JOHN A. WILSON,
BY
Knight & Rodgers
ATTORNEYS.

United States Patent Office 2,718,147
Patented Sept. 20, 1955

2,718,147

LIQUID LEVEL INDICATOR

John A. Wilson, El Monte, Calif.

Application June 8, 1953, Serial No. 360,221

5 Claims. (Cl. 73—328)

The present invention relates generally to liquid level indicating devices and more particularly to a simple form of sight-glass or the like which may be attached to a tank in order that the liquid level, at least within a critical range, may be observed.

Often a tank for holding liquids is built without any means for determining the level of liquid inside and it is later found desirable to add some type of gauge or indicator. Such an indicator of the liquid level may be of the comparatively simple type, as a sight-glass, but nevertheless is difficult to install by conventional methods because it is not possible to work from the inside of the tank. One example that may be given is the oil tank on a motorcycle. Here it is very convenient to know when the level of the contents drops below a given heighth or a given range, below which the tank should be filled. At the same time, conventional types of indicators secured in place by conventional means are prohibitively difficult to install. There is no access to the interior of the tank to tighten up threaded members, such as nuts or fittings, and it is dangerous to weld pipes to openings in the tank. At the same time a definite need exists for a simple form of indicator which can be quickly and easily installed.

It is therefore a general object of my invention to devise a type of indicator which may be attached to the walls of a tank or similar container in order to give a direct visual indication of the level of liquid therein when the walls of the container are opaque.

It is a further object of my invention to provide a liquid level indicator of the character described which may be easily and simply attached to a tank by operations or manipulations which may be performed entirely outside the tank and thus eliminate the necessity for working inside the tank.

It is a further object of my invention to devise a liquid level indicator which is simple in construction and economical in design and which may be sold as a separate accessory for attachment to existing tanks.

These and other objects and advantages of my invention have been attained by providing a transparent body having an upwardly extending internal fluid passage means which opens at two spaced locations to the outside of the body and is adapted to receive liquid from the tank through a hole in the tank wall. Means for attaching the transparent body to the tank wall includes a single U-shaped attaching member having a base section, which bears against the inner face of the tank wall, and two parallel legs, one at either end of the base section, which project inwardly through holes in the tank wall and through the body. These same holes are preferably used for communication of liquid within the tank with the passage means inside the body; and for this reason there is sufficient clearance between the legs of the attaching means and the holes in the tank wall or the terminal portions of the passage means inside the body to permit fluid flow from the tank interior into the body passage means. The attaching means also preferably includes fastening means such as nuts or the like which are threaded onto the ends of the parallel legs to press the transparent body against the outside face of the tank wall. Suitable sealing means are provided between the body and the tank and between the body and the nuts in order to prevent leakage at these points.

How the above objects and advantages of my invention, as well as others not specifically mentioned herein, are attained, will be more readily understood by reference to the following description and to the annexed drawings, in which.

Figure 1:
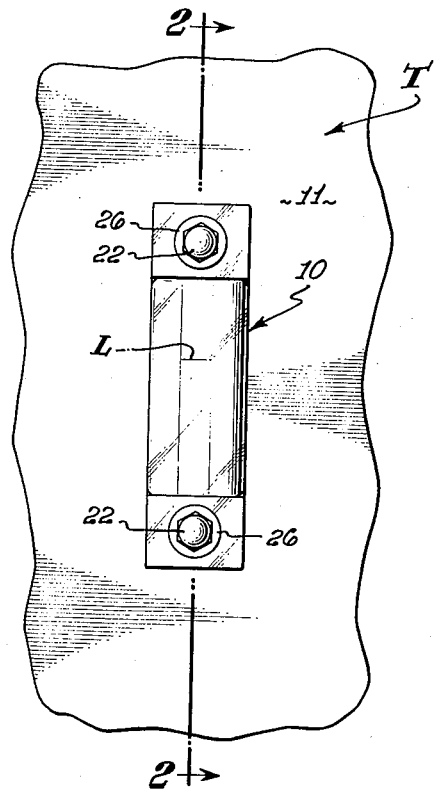
Fig. 1 is a front elevation of a liquid level indicator constructed according to my invention attached to the wall of a tank containing liquid.
Figure 2:
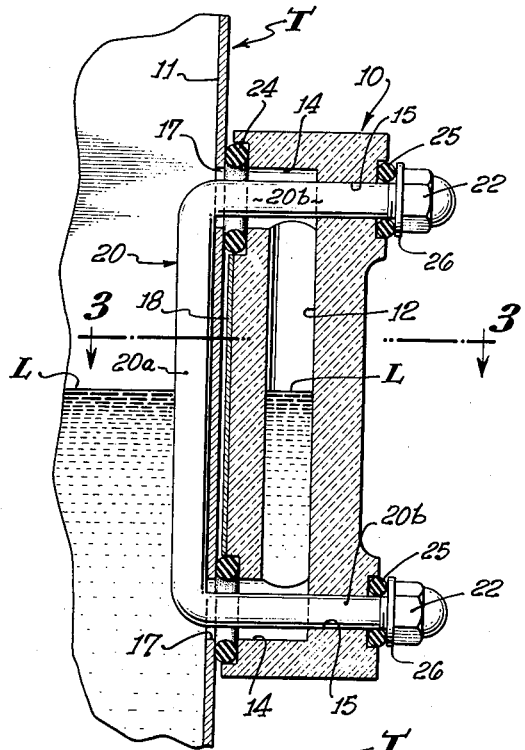
Fig. 2 is an enlarged vertical median section taken on line 2—2 of Fig. 1.
Figure 3:
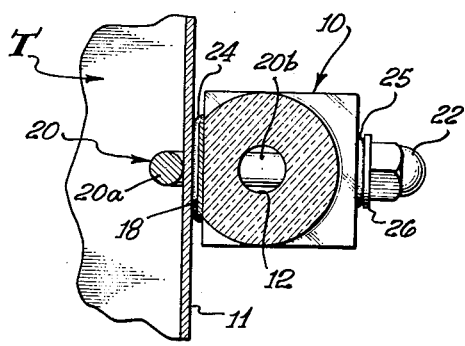
Fig. 3 is a horizontal transverse section on line 3—3 of Fig. 2.

Referring now to the drawings, there is shown in Figs. 1, 2, and 3 a liquid level indicator of preferred construction according to my invention. The indicator includes a body 10 which is shown as being installed against the outside face of wall 11 of a tank T containing a body of liquid, the surface of which is indicated at L. The body may be made of any suitable transparent substance, for example, glass or any one of a number of transparent or highly translucent synthetic resins, commonly referred to as "plastics." The body may be molded or cast but it is here shown as it appears when machined from a rectangular block of a suitable plastic.

As may be seen clearly in Fig. 2, body 10 has an internal, longitudinally extending bore 12 which may be formed by drilling from one end of the original blank so that bore 12 terminates short of the other end of the body, and then plugging up the first end of the bore. Subsequently, a hole is drilled near each end of body 10 transversely through the body at a position to intersect one end of bore 12. These two transverse bores each comprise a first section 14 of relatively large diameter and a second concentric section 15 of reduced diameter, the first section extending inwardly from the face of the body far enough to intersect or join with longitudinally extending bore 12.

Taken together, longitudinal bore or passage 12 and the two transverse bores 14 form a continuous internal passage through the body which opens to the outside of the body at two spaced locations on the same side of body 10. The bores 14 are terminal portions of this internal passage means. Since bore 12 is normally arranged in a vertical position or substantially so when the indicator is attached to the wall 11 of a tank, the passage means as a whole may be referred to as being upwardly extending. The outer ends of bores 14 where they open to the outside of body 10 are at different levels, though one need not be directly over the other, and so are normally referred to as vertically spaced apart.

Each bore 14 is in registration with a hole 17 in the wall of the tank. For reasons which will be apparent later, holes 17 and bores 14 are preferably each of substantially the same diameter. Obviously, the spacing between holes 17 is the same as the spacing between bores 14 in order to attain simultaneous registry of each bore 14 with its associated hole in the tank wall.

The central portion of body 10 is preferably cylindrical except for a flat portion on the back side. This outline makes it easier to see the column of liquid in bore 12 from the sides. Visibility of the liquid column may be increased by placing a layer 18 of paint or tape in some contrasting color, such as red, along the flat back side of the body.

The means for attaching body 10 to the tank wall 11 includes, in a preferred form, U-bolt 20. Attaching member 20 comprises a straight base section 20a at each end of which there is located an integral leg 20b. The two legs 20b are parallel to each other and are preferably threaded at their outer ends to receive nuts 22 or other fastening means.

When the indicator is attached to the tank as in Fig. 2, a base section 20a bears against the inside face of the tank wall, as shown, while each leg 20b extends through an opening 17 in the tank wall and then on through bore 14 and the aligned bore 15 to project beyond the body of the indicator.

It is desirable to make the inside face of the U-shaped member 20 a sharp 90° angle when the legs and base section meet. This allows the base section to bear against the tank wall evenly over its length and, more important, avoids bearing only at the edges of holes 17. Contact with the tank wall only at these two positions concentrates the stresses sufficiently that the walls may be deformed and leakage caused when nuts 22 are tightened down.

In order that there may be free communication between the interior of the tank and the internal liquid passage means within the body, clearance is provided between each leg 20b and the body 10 where the leg passes through the terminal portion of the internal passage means of the body. One convenient way to secure this clearance is to make each bore 14 of a diameter larger than the outside diameter of the leg 20b passing through it. The same applies to the opening 17 which is made larger than the diameter of leg 20b, being preferably the same diameter as the associated bore 14, in order to allow fluid to flow freely out of tank T into the level indicator. It will also be realized that it is within the scope of my invention to use any other suitable construction which permits each leg of attaching member 20 to pass through a portion of the passage means within the body and at the same time maintain the passage means in free communication with the interior of the tank. To indicate the proper level of liquid in the tank both the holes 17 and both ends of the fluid passage in body 10 should be unobstructed.

Each bore 15 is preferably substantially the same in diameter as legs 20b of the attaching member in order that the body can slide along the legs but is held against lateral movement relative to U-bolt 20.

Sealing means are provided between the indicator body and the outside face of the tank wall and also between the body and nuts 22. This may be accomplished by providing O-rings 24 and 25 at these respective locations. These O-rings are of conventional design and made of rubber, neoprene, or other suitable material. It will be understood that any other type of sealing means of suitable design may be used instead. It is desirable to counterbore the outer end of each bore 14 for a short distance in order to receive an O-ring 24, the depth of the counterbore being less than the thickness of the O-ring in order that firm contact may be had between the O-ring and the outer face of the tank wall, as indicated particularly in Figs. 2 and 3. O-ring 24 is of sufficiently large diameter that it surrounds opening 17 in tank wall 11 and when pressed firmly between body 10 and the tank wall it provides an effective seal which prevents leakage of liquid from an opening 17. A similar construction is employed to receive each O-ring 25. The body is counterbored at the outer end of bore 15 to receive O-ring 25 which is compressed between the body and a washer 26 underneath a nut 22 to prevent leakage at this location.

Figure 4:
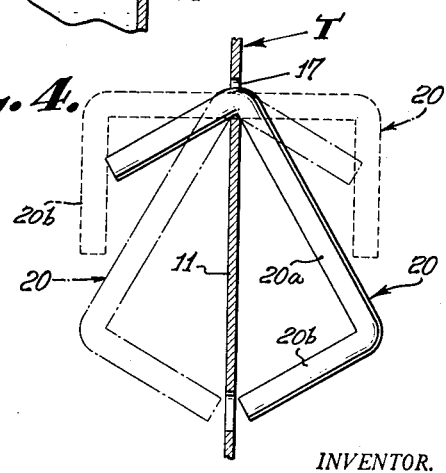
Fig. 4 is a diagrammatic view showing successive steps in the placement of the U-shaped attachment means in the tank wall.

Installation of the liquid level indicator is very simple. The first step is to drill through the tank wall 11 from the outside, drilling two holes 17 which are properly spaced to register with bores 14 and to receive legs 20b of the attaching member. After these two holes are drilled in the tank wall, attaching member 20 alone is first placed in position. One leg of the attaching member is first inserted through one of the drilled holes in the tank wall, as for example the upper hole, as shown in Fig. 4. While holding the attaching member only at positions outside of the tank, the U-shaped member is then rotated counterclockwise to pass the first bend in it through the openings in the tank wall after which the straight base portion 20a is slid through the upper opening 17, bringing the attaching member into some such position as is indicated by the dotted line position of Fig. 4.

Placement is continued by moving the attaching member inwardly through hole 17 and at the same time rotating it counterclockwise until it reaches a position as shown by the dot-dash line position of Fig. 4 in which the second bend is passing through the upper hole 17. Continuing this same rotational movement brings the first leg opposite and eventually through the lower hole 17 so that the leg projects outwardly of the tank wall. Straight base section 20a is brought into engagement with the inner face of tank wall 11. This final position of the U-shaped attaching member is shown in Fig. 2. The body 10 with the sealing O-rings held in place on the body is then slipped over the two legs 20b and finally nuts 22 are screwed onto the ends of the legs. By turning down the nuts the body 10 is urged toward the tank wall to compress all four of the O-rings. This force exerted by nuts 22 causes all the O-rings to effectively perform their sealing function and prevent leakage of liquid around openings 17 or around the points at which legs 20b emerge from body 10.

When the distance between the two legs is about 2–3 inches, it is preferable that each leg 20b be about one-half the length of base section 20a, or less. This proportion of the parts permits the manipulation of the U-shaped member through the two holes 17 as just described. If the legs are relatively longer, the size of holes 17 must be increased beyond desirable limits. Of course base section 20a may be lengthened without lengthening the legs so that the ratio of the lengths decreases and holes 17 need not be enlarged.

It will be apparent that persons skilled in the art may make various changes in the size or shape of the parts of my improved liquid level indicator without departing from the spirit and scope of my invention. For example, my invention is not necessarily limited to the exact shape of the internal liquid passage means in body 10 as shown. Here the passage comprises three straight sections which intersect and join, because of the manner of forming the passage; but it may take other shapes. Likewise, the length of the body may be changed to take in a greater or smaller range of indicated positions for the level L of liquid. Accordingly it is to be understood that the foregoing description is considered as being illustrative of, rather than limitative upon, the appended claims.

I claim:

1. A liquid level indicator adapted for external attachment to the wall of a tank to indicate the level of liquid within the tank, that comprises: a transparent body having two spaced parallel bores extending transversely through the body and opening at opposite sides of the body, the body also having an upwardly extending internal liquid passage interconnecting said two bores; a U-shaped attaching member having a base section and two parallel legs located one at each end of the base section and slidably passing through one of said transverse bores, there being clearance between each leg and the wall of the associated transverse bore for at least a part of the length of the bore; and fastening means mounted on the outer end of each leg and bearing against the body to urge the body relative to the leg in the direction of said base section.

2. A liquid level indicator for tanks and the like adapted to direct attachment to a wall of the tank having two spaced holes, that comprises: a transparent body having two spaced transverse bores extending through the body and each registerable with a hole in the tank wall, and also having an internal liquid passage interconnecting said bores; an integral U-shaped attaching member having its legs each passing through one of said bores in the body; and fastening means on the end of each leg bearing against the body to hold it against the tank wall.

3. In combination with a wall of a tank adapted to hold liquid, said wall having a pair of spaced openings, a liquid level indicator that comprises: a transparent body at the outside face of said wall and having two spaced transverse bores registering with said openings in the tank wall and an upwardly extending internal liquid passage connected at its ends to the said two transverse bores; and attaching means including a U-shaped attaching member having a base section and two parallel legs, said base section engaging the inside face of the tank wall and said legs passing through the openings in the tank wall and said transverse bores with clearance permitting liquid to enter said liquid passage from the tank.

4. A liquid level indicator adapted for attachment to the outer face of a tank to indicate the level of liquid within the tank, that comprises: a transparent body having an upwardly extending internal fluid passage opening to the outside of the body at two spaced locations of which at least one is at one side of the body, said passage being adapted to hold liquid received from the tank interior when in communication therewith through a hole in the tank wall; and body attaching means including a U-shaped attaching member having a base section and two spaced parallel legs integral with the base section and passing transversely through the body, one of said legs also passing through the opening of said internal fluid passage to said one side of the body and through the tank wall with clearance to permit fluid flow around the leg and into the internal fluid passage from the tank interior.

5. A liquid level indicator adapted for attachment to the outer face of the tank to indicate the level of liquid within the tank, that comprises: a transparent body having an upwardly extending internal fluid passage opening at its ends to the outside of the body at two spaced locations both at one side of the body, said passage being adapted to hold liquid received from the tank interior when in communication therewith through a hole in the tank wall; and body attaching means including a U-shaped attaching member having a base section and two parallel legs integral with the base section and spaced apart the same distance as said locations, said legs passing transversely through the body and each one of said legs passing through a portion of said fluid passage at an opening to said one side of the body and through the tank wall with clearance to permit fluid flow around the leg and into the internal fluid passage from the tank interior.

References Cited in the file of this patent

UNITED STATES PATENTS 2,647,406     Sorensen _____ Aug. 4, 1953